(12) United States Patent
Chyla et al.

(10) Patent No.: US 7,650,816 B2
(45) Date of Patent: Jan. 26, 2010

(54) DEFLECTION LEVER

(75) Inventors: Thomas Chyla, Berlin (DE); Friedrich Löbner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 753 days.

(21) Appl. No.: 10/552,708

(22) PCT Filed: Mar. 8, 2004

(86) PCT No.: PCT/DE2004/000490

§ 371 (c)(1),
(2), (4) Date: Oct. 7, 2005

(87) PCT Pub. No.: WO2004/092604

PCT Pub. Date: Oct. 28, 2004

(65) Prior Publication Data

US 2007/0022837 A1    Feb. 1, 2007

(30) Foreign Application Priority Data

Apr. 9, 2003   (DE) ................................ 103 16 722

(51) Int. Cl.
*G05G 1/00* (2006.01)
*G05G 1/04* (2006.01)
*F16H 35/08* (2006.01)

(52) U.S. Cl. ............................ 74/559; 74/522; 74/831

(58) Field of Classification Search ................ 74/10.27, 74/10.29, 10.31, 10.33, 10.35, 10.37, 17.5, 74/510, 522, 525, 559, 568 R, 600, 831, 835
See application file for complete search history.

(56) References Cited

U.S. PATENT DOCUMENTS

| | | | |
|---|---|---|---|
| 1,421,408 A | | 7/1922 | Collyer |
| 2,841,991 A | * | 7/1958 | Saalfrank ........................ 74/40 |
| 2,972,894 A | * | 2/1961 | Bennett ........................ 74/40 |
| 3,255,641 A | | 6/1966 | Russel |
| 4,235,130 A | * | 11/1980 | Dulger et al. ................. 74/831 |
| 4,372,903 A | * | 2/1983 | Affolder ...................... 264/109 |
| 5,860,318 A | * | 1/1999 | Thomas ........................ 74/40 |
| 6,053,076 A | | 4/2000 | Barnes |

FOREIGN PATENT DOCUMENTS

| | | |
|---|---|---|
| DE | 693 07 560 T2 | 9/1993 |
| DE | 200 17 252 U1 | 3/2002 |
| EP | 0 310 538 A1 | 4/1989 |
| EP | 0 559 552 B1 | 9/1993 |
| FR | 2 637 953 A1 | 4/1990 |

* cited by examiner

*Primary Examiner*—Thomas R Hannon
*Assistant Examiner*—James Pilkington
(74) *Attorney, Agent, or Firm*—Laurence A. Greenberg; Werner H. Stemer; Ralph E. Locher

(57) ABSTRACT

On a high-voltage power switch there is provided a shaft for transmitting a rotary motion through a wall. A deflection lever is disposed on the shaft. The shaft and the deflection lever are part of a kinematic chain. For adjustment of the deflection lever in its position on the shaft, the deflection lever has an adjusting device.

6 Claims, 3 Drawing Sheets

DEFLECTION LEVER

CLAIM FOR PRIORITY

This application is a national stage of PCT/DE2004/000490 which was published on Oct. 28, 2004 and which claims the benefit of priority to German Application No. 10316722.6 filed Apr. 9, 2003.

TECHNICAL FIELD OF THE INVENTION

The invention relates to a deflection lever having an adjusting device.

BACKGROUND OF THE INVENTION

A deflection lever emerges, for example, from utility model patent specification DE 200 17 252 U1. The known deflection lever can be mounted on a shaft by form closure. To this end, the shaft has an outer toothing which secures the position of the deflection lever on the shaft.

Depending on the shaping of the toothing, an adjustment of the deflection lever on the shaft is possible only within a step width defined by the tooth spacing.

SUMMARY OF THE INVENTION

The present invention configures a deflection lever of the type stated in the introduction such that a precise adjustment of the angular position of the deflection lever relative to a shaft is enabled.

In a deflection lever of the type stated in the introduction, in one embodiment according to the invention, the deflection lever has a recess which is penetrated by the adjusting device in a rotationally movable manner and the adjusting device can be connected in an angularly rigid manner to a shaft, and the adjusting device having a lever arm which can be secured to an adjustable stop.

As a result of the adjusting device, it is possible to adjust the deflection lever already in a state in which it is mounted on the shaft. A mounting and dismounting of the deflection lever for adjustment is in this way avoided. This is particularly advantageous where an adjustment of the deflection lever in the fitted state is necessary. Such deflection levers are used, for example, in the power trains of high-voltage power switches. In the course of repeated motions of a kinematic chain in which the deflection lever is disposed, a maladjustment can ensue. These divergences can be compensated by adjustment of the deflection lever. The adjusting device is disposed fully on the deflection lever. It is thereby possible to use a deflection lever according to the invention also in lever chains which are known per se. Additional apparatuses or elements are not required. Furthermore, the rotationally movable mounting of the adjusting device allows a continuous adjustment of the position of the deflection lever. If the stop is disposed on the deflection lever, the entire construction is disposed directly on the latter.

A further advantageous embodiment can provide that the stop is displaceable along an axis situated at right angles to the rotation axis of the shaft.

Along an axis, the stop is easily displaceable. Along the axis, a scale can be provided, for example, according to which an adjustment can be straightforwardly performed. The scale can be calibrated in different values, such as, for example, rotation angle or length. The axis along which the stop is displaceable can in this case run, for example, through the rotation axis of the shaft or, indeed, at a skew to the rotation axis.

A further advantageous embodiment can provide that the stop is formed by a groove.

Through the use of the groove flanks, a groove allows a stop to be formed which acts in several directions. Apart from the securement by the flanks, it is further allowed to displace the stop point of the lever arm within the groove. This creates a simple construction, which transmits a rotary motion in two directions and is adjustable in this regard. Such a stop is easily adjustable without dismantling the whole of the actual construction.

It can further advantageously be provided that in the groove a sliding block is guided, to which the lever arm is connected.

Through the insertion of a sliding block, the transmission of forces between the adjoining surfaces is improved. At the same time, the forces to be transmitted are distributed over a larger region of the groove flanks. A dislodgement or deflection of the groove is thereby prevented.

A further advantageous embodiment can provide that, in case of a projection in the direction of the rotation axis of the shaft, an acute angle is formed between the lever axis of the deflection lever and the longitudinal axis of the groove.

The acute angle allows the groove to be displaced along an axis and, at the same time, the lever arm to be left to be connected up in the groove. As a result of the slight incline, the forces for the adjustment of the stop are reduced. Hence the lever chain can be left in the fitted state and the effects of the adjustment on the deflection lever can be simultaneously observed also on the other elements. The adjustment is thereby simplified.

A further embodiment can provide that the adjusting device is a sleeve.

A sleeve allows, on the one hand, a rotationally movable mounting of the adjusting device in the recess of the deflection lever. On the other hand, a sleeve can be easily mounted on a shaft and connected to the shaft in an angularly rigid manner. A sleeve enlarges the diameter of the shaft only slightly, so that, as a result of the adjustment device, the construction of the deflection lever itself is enlarged only to a relatively small extent. The sleeve can herein be configured in such a way that it has a continuous opening for the reception of the shaft, in the style of a hollow cylinder, or the sleeve is closed at one end in the style of a pot.

BRIEF DESCRIPTION OF THE DRAWINGS

An illustrative embodiment of the invention is shown below in diagrammatic representation with reference to a drawing and described in greater detail, in which drawing.

DETAILED DESCRIPTION OF THE INVENTION

Figure 1:
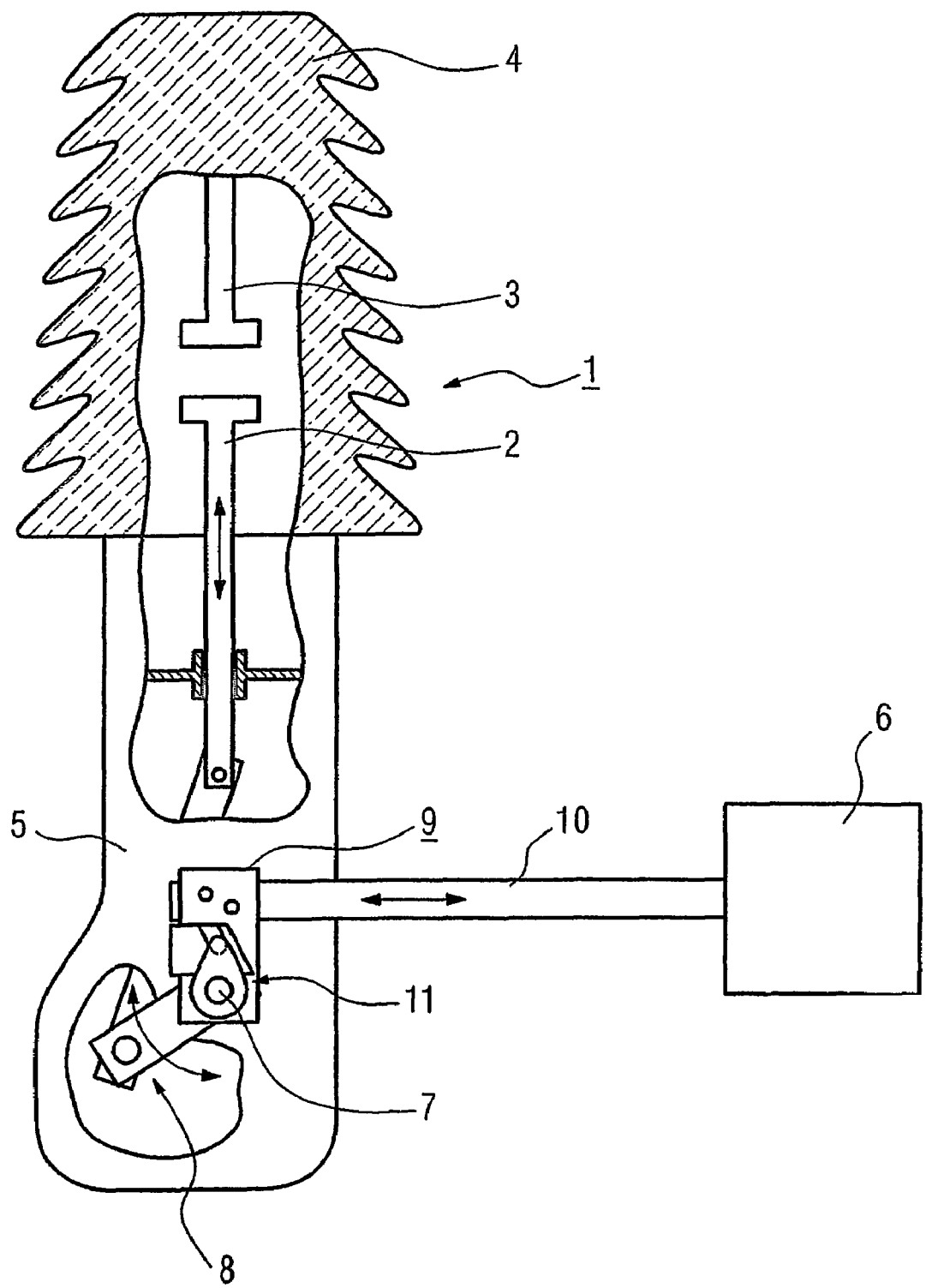
FIG. 1 shows a deflection lever on a high-voltage power switch.

FIG. 1 shows a side view of a high-voltage power switch 1 partially provided with clearance cuts. The high-voltage power switch 1 has a contact system, which is formed from a movable first contact element 2 and a rigid second contact element 3. The first contact element 2 and the second contact element 3 are disposed within an isolating housing 4. The isolating housing 4 is supported by a deflection housing 5.

The first contact element 2 is coupled by a kinematic chain to a drive 6. Part of the kinematic chain is a shaft 7. The shaft 7 is mounted on the deflection housing 5 and penetrates a wall of the deflection housing 5. Via a connecting rod combination 8, a rotary motion of the shaft 7 is converted inside the deflection housing 5 into a linear motion of the first contact element 2. By means of the shaft 7, a rotary motion can be transmitted through a wall of the deflection housing 5. The pass-through point of the shaft 7 on the deflection housing 5 can be easily sealed by means of sealing rings, so that the inside of the high-voltage power switch is hermetically closed off from its environment. A filling of the inside of the high-voltage power switch 1, for example with an electronegative gas under increased pressure, is thus possible.

At that end of the shaft 7 which is situated outside the deflection housing 5, there is disposed a deflection lever 9. The deflection lever 9 is coupled by a drive rod 10 to the drive 6 and converts a linear motion of the drive rod 10 via the shaft 7 into a rotary motion. The deflection lever 9 has an adjusting device 11. By means of the adjusting device 11, the position of the deflection lever 9 on the shaft 7 can be adjusted. Since the deflection lever 9 is disposed fully outside the high-voltage power switch 1, an adjustment of the kinematic chain, which serves to drive the first contact element 2, can be effected fully outside the high-voltage power switch 1. It is thus possible, for example, to adjust the contact distance between the first contact element 2 and the second contact element 3, without having to intrude inside the high-voltage power switch 1.

Figure 2:
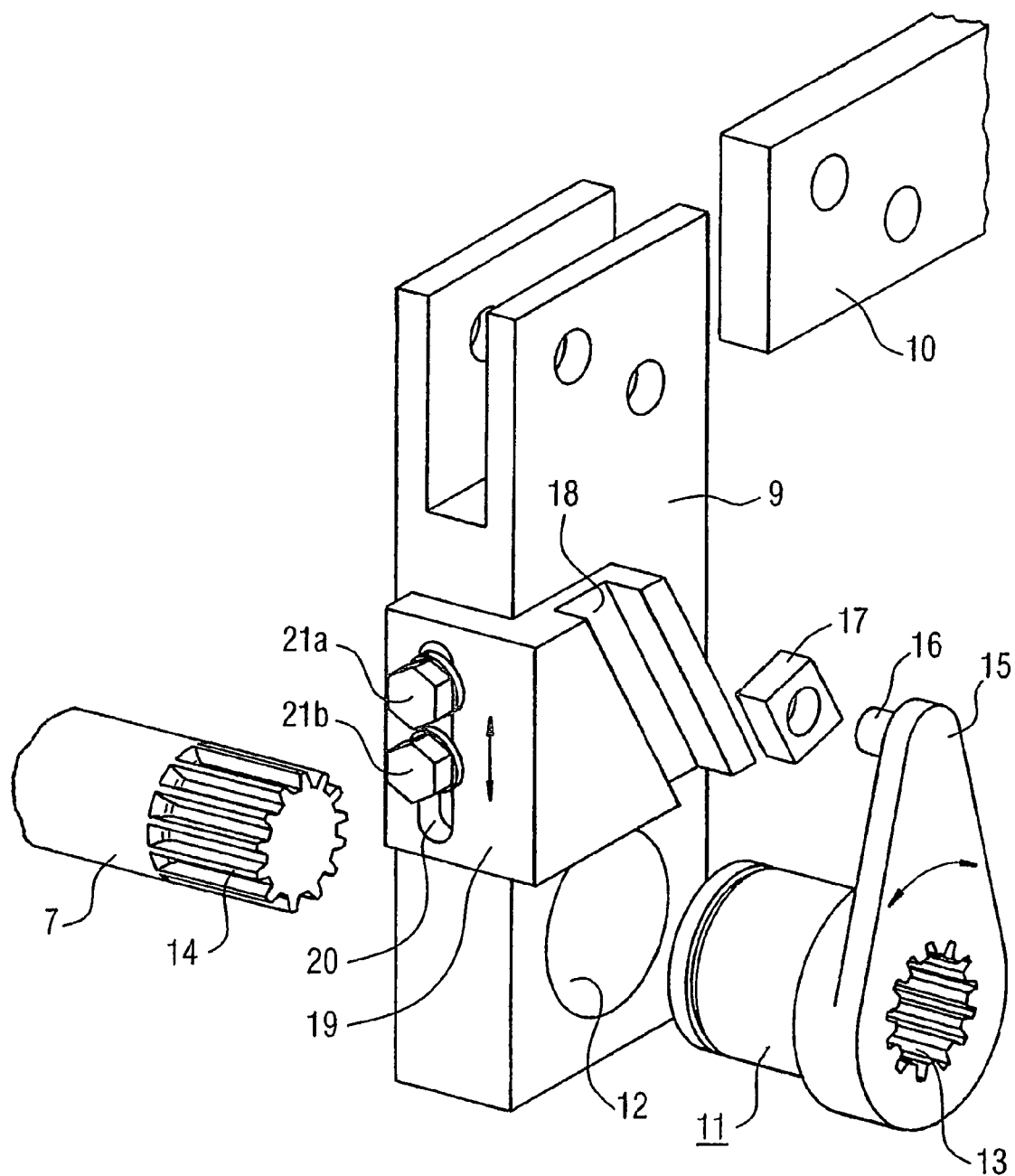
FIG. 2 shows an exploded representation of the deflection lever known from FIG. 1.

FIG. 2 shows an exploded representation of the deflection lever 9 having the adjusting device 11. The drive rod 10 can be coupled to the deflection lever 9 by means of a bolt (not represented in FIG. 2). The deflection lever 9 has a recess 12, which is penetrated by the adjusting device 11. In the present case, the adjusting device 11 is configured as a sleeve. The adjusting device 11 is mounted rotatably within the recess 12. The adjusting device 11 further has a recess 13, which, in the fitted state, is disposed coaxially to the recess 12 of the deflection lever 9. The recess 13 of the adjusting device 11 serves for the reception of the shaft 7. For the non-positive connection of the adjusting device 11, its recess 13 is provided with an inner toothing, which corresponds with an outer toothing 14 disposed on that end of the shaft 7 located outside the high-voltage power switch 1. In addition, the adjusting device 11 has a lever arm 15. The lever arm 15 is disposed radially to the rotation axis of the adjusting device 11. The lever arm 15 has a spigot 16. In the assembled state, the spigot 16 juts into an opening in a sliding block 17. The sliding block 17 is guided in a groove 18. As a result of the groove 18, via the sliding block 17, the spigot and the lever arm 15, the rotatability of the adjusting device 11 is restricted. Through a displacement of the groove 18 along an axis situated at right angles to the rotation axis of the shaft 7 and of the adjusting device 11, the position of the adjusting device 11 in the recess 12 and hence the position of the deflection lever 9 on the shaft 7 is adjustable. For the adjustment of the groove 18, this is connected to a supporting body 19, which has a long hole 20. The long hole 20 is passed through by fastening elements 21*a*, 21*b*. Advantageously, the fastening elements 21*a*, 21*b* should be able to be repeatedly loosened. For this, screw connections, in particular, are suitable. Following a loosening of the fastening elements 21*a,b*, the supporting body 19 is displaceable along the long hole 20. The groove 18 is thus also displaceable. Following on from this, a rotary motion of the lever arm 15 is compelled and hence the adjusting device 11 adjusted in terms of its angular position in the recess 12. An adjustment or setting of the deflection lever 9 can be effected in a fitted state of the deflection lever 9, i.e. mounted the shaft 7 and flange-connected to the drive rod 10.

Figure 3:
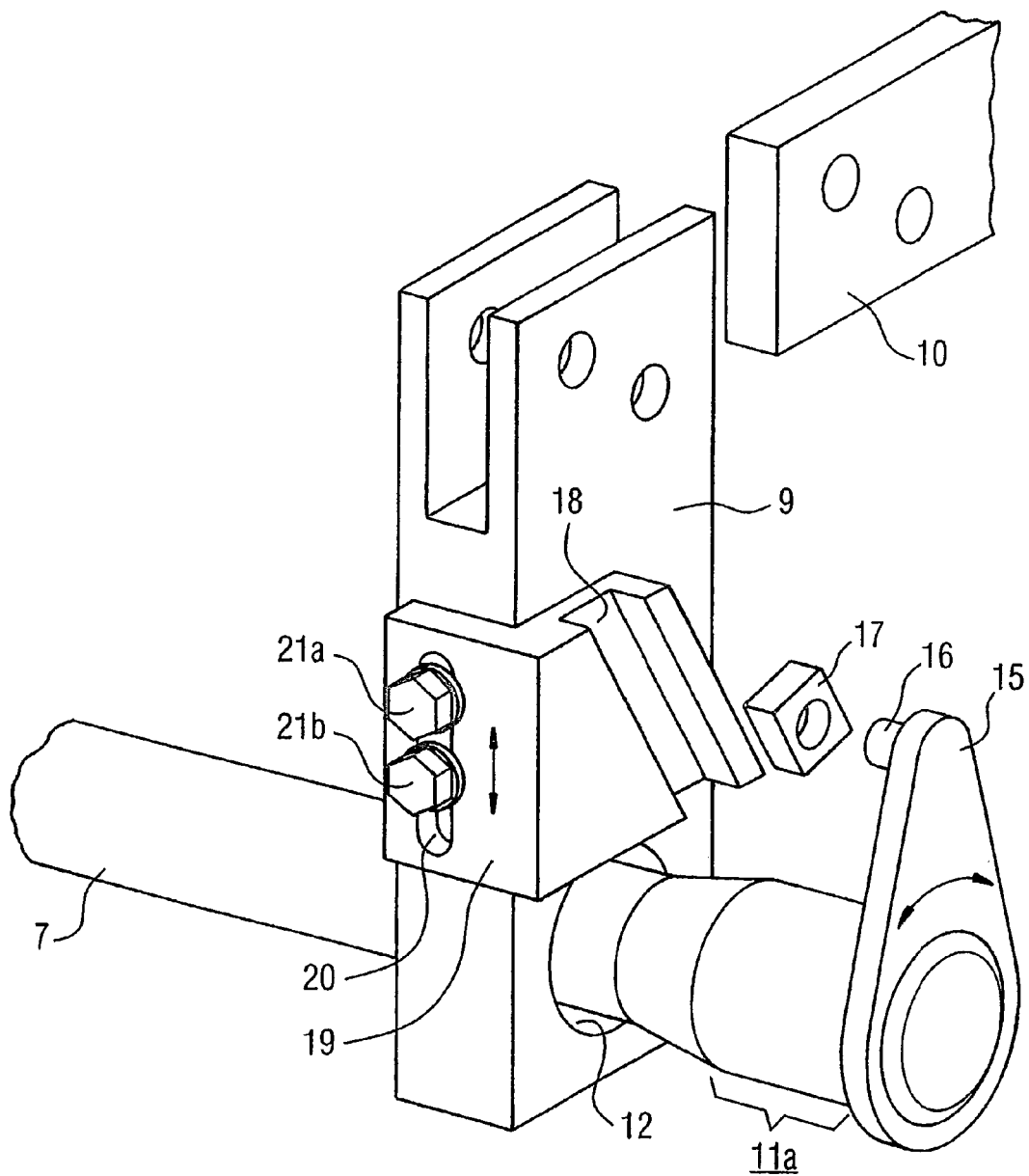
FIG. 3 shows an exploded representation of a deflection lever having an away-facing adjusting device.

FIG. 3 showed a modification of the adjusting device 11 known from FIG. 2. The adjusting device 11*a* represented in FIG. 3 is formed partially from a portion of the shaft 7. The portion is of thickened construction, but can also have the diameter of the shaft 7. That region of the adjusting device 11*a* which reaches through the recess 12 and is mounted in a rotationally movable manner in the latter is connected to the lever 15 by means of a weld joint.

What is claimed is:

1. A deflection lever assembly, comprising:
   an adjusting device;
   a deflection lever having a recess, the adjusting device being disposed in the recess in a rotationally movable manner;
   the adjusting device being connected in an angularly rigid manner to a shaft, the adjusting device having a lever arm, the lever arm being secured to an adjustable stop, the adjustable stop disposed on the deflection lever and adjustable with respect to the deflection lever along an axis disposed perpendicular to a rotational axis of the shaft for setting an angular position of the adjusting device in the recess.

2. The deflection lever assembly as claimed in claim 1, wherein the stop is formed by a groove.

3. The deflection lever assembly as claimed in claim 2, wherein a sliding block connected to the lever arm is guided in the groove.

4. The deflection lever assembly as claimed in claim 2, wherein there is an acute angle between the lever axis of the deflection lever and a longitudinal axis of the groove.

5. The deflection lever assembly as claimed in claim 1, wherein the adjusting device is a sleeve.

6. The deflection lever assembly as claimed in claim 1, wherein the adjustable stop has an elongated slot formed therein, the adjustable stop is mounted to the deflection lever by fastening elements disposed in the slot.

\* \* \* \* \*